United States Patent [19]
Ellin

[11] 3,935,514
[45] Jan. 27, 1976

[54] FLASH LAMP SIGNALING CIRCUIT EMPLOYING LOGIC SIGNAL ACTIVATION

[75] Inventor: Seymour Ellin, Brookline, Mass.

[73] Assignee: Polaroid Corporation, Cambridge, Mass.

[22] Filed: Apr. 20, 1973

[21] Appl. No.: 353,007

Related U.S. Application Data

[63] Continuation-in-part of Ser. No. 321,993, Jan. 8, 1973, abandoned.

[52] U.S. Cl. ................................. 317/80; 431/95
[51] Int. Cl.² ........................................ F21K 5/02
[58] Field of Search ............... 95/11.5 R; 240/1.3; 315/323, 241 P; 317/80; 431/95; 354/142, 143, 128

[56] References Cited
UNITED STATES PATENTS

| | | | |
|---|---|---|---|
| 3,518,487 | 6/1970 | Tanaka | 431/95 X |
| 3,618,492 | 11/1971 | Ellin | 95/11.5 R |
| 3,668,468 | 6/1972 | Kornrumpf | 315/323 |
| 3,676,045 | 7/1972 | Watrous | 431/95 |
| 3,699,861 | 10/1972 | Burgarella et al. | 354/142 |
| 3,728,947 | 4/1973 | Harnden et al. | 354/128 |
| 3,787,167 | 1/1974 | Watrous | 431/95 |

*Primary Examiner*—J. V. Truhe
*Assistant Examiner*—Clifford C. Shaw
*Attorney, Agent, or Firm*—David R. Thornton

[57] ABSTRACT

A photographic flash firing circuit operative to sequentially ignite each of an array of flash lamps in a predetermined order from first to last responsive to an input signal. The circuit is constructed as an integrated circuit including a dual set of circuit components capable of being interconnected for either low level, logic triggering or pulse triggering of the circuit. Basically, the firing circuit includes a plurality of lamp switching circuits and a forward sequencing circuit which sequentially couples each lamp across a supply voltage in accordance with repetitive activation by a suitable trigger network. In the logic trigger arrangement, the trigger network includes a transistor buffer stage and voltage divider network coupled to the forward sequencing circuit and operative to trigger the latter in accordance with operation of the camera exposure control system.

3 Claims, 3 Drawing Figures

FLASH LAMP SIGNALING CIRCUIT EMPLOYING LOGIC SIGNAL ACTIVATION

CROSS REFERENCE TO RELATED APPLICATIONS

This is a continuation-in-part of application Ser. No. 321,993, filed Jan. 8, 1973, now abandoned.

BACKGROUND OF THE INVENTION

This invention relates to photoflash firing circuits and more particularly to an improved photoflash sequencing circuit employing either logic level or pulse triggering.

Photographic flash systems in which a plurality of flash lamps are arranged as an array within a single disposable package are advantageous in that the arrayed lamps are oriented for providing illumination from each individual lamp without recourse to moving or rotating the flash lamps on their mounting, etc. Flash arrangements of this type generally require firing circuits which sequentially ignite the bulbs in a predetermined order from first to last in synchronization with successive exposures.

Such firing circuits generally depend upon the variation in lamp characteristics before and after firing to provide proper sequencing. Generally, flash lamps with which the sequencing circuit must operate include a glass envelope within which is sealed a quantity of combustible filamentary strand material in combustion supporting gas such that upon application of current to the terminals of the lamp, the igniting filament rapidly heats to the combustion point of the strand material and flash ignition ensues. During ignition, the filament is generally open circuited such that upon completion of ignition the lamp terminals are opened circuited and the switching circuit to which they are coupled witnesses an infinite resistance.

In one flash sequencing circuit available in the prior art, a plurality of lamp switching circuits are coupled in series with respective lamp terminals and intercoupled with a forward sequencing circuit which sequentially fires each bulb in succession and by passes open or previously fired bulbs. In this circuit, each lamp with its associated switching circuit is coupled in parallel across a power source. Interconnected to each switching circuit is a forward sequencing circuit which in response to an appropriate trigger pulse is configured to fire the next operable lamp in the array. In this arrangement, the sequencing circuit is triggered so as to successively fire each individual lamp circuit in accordance with a voltage pulse which exceeds the source voltage. Since it is often desirable to employ the full voltage of the camera battery for lamp ignition, this triggering arrangement requires that the camera exposure system provide a pulse in excess of source voltage. Many camera exposure systems do not readily provide an appropriate pulse voltage of this type. Hence, it is important to provide a photoflash firing circuit designed for low voltage triggering. Further, since firing circuits of this type may be advantageously constructed as a unitary semiconductor chip, it is also important to provide a basic chip having both triggering capabilities.

Consequently, it is a primary object of this invention to provide an improved photoflash sequencing circuit capable of being operated by a level logic signal.

It is another object of this invention to provide a photoflash sequencing circuit incorporating a logic gate triggering system.

It is still another object of this invention to provide a photoflash sequencing circuit incorporating both low level logic and pulse triggering capabilities.

SUMMARY OF THE INVENTION

The present invention is directed to a fully electronic control circuit for sequentially igniting each photoflash lamp of a series array in response to an appropriate input signal. The basic circuit includes selectively operable means for sequentially coupling each of the flash lamps to a voltage supply, and trigger means for rendering the sequential coupling means operative responsive to a camera exposure system. The invention features a plurality of lamp switching circuits arranged for parallel connection with a voltage source and intercoupled to a forward sequencing circuit which upon repetitive activation is configured for sequentially rendering each switching circuit conductive so as to thereby sequentially supply current to each of the lamps. Coupled to the forward sequencing circuit is either a logic circuit or a pulse circuit which are configured for rendering the forward sequencing circuit operative responsive respectively to a low level logic signal or a relatively high voltage pulse signal so as to flash an appropriate one of the lamps during the exposure operation.

DETAILED DESCRIPTION

Figures 1, 2:
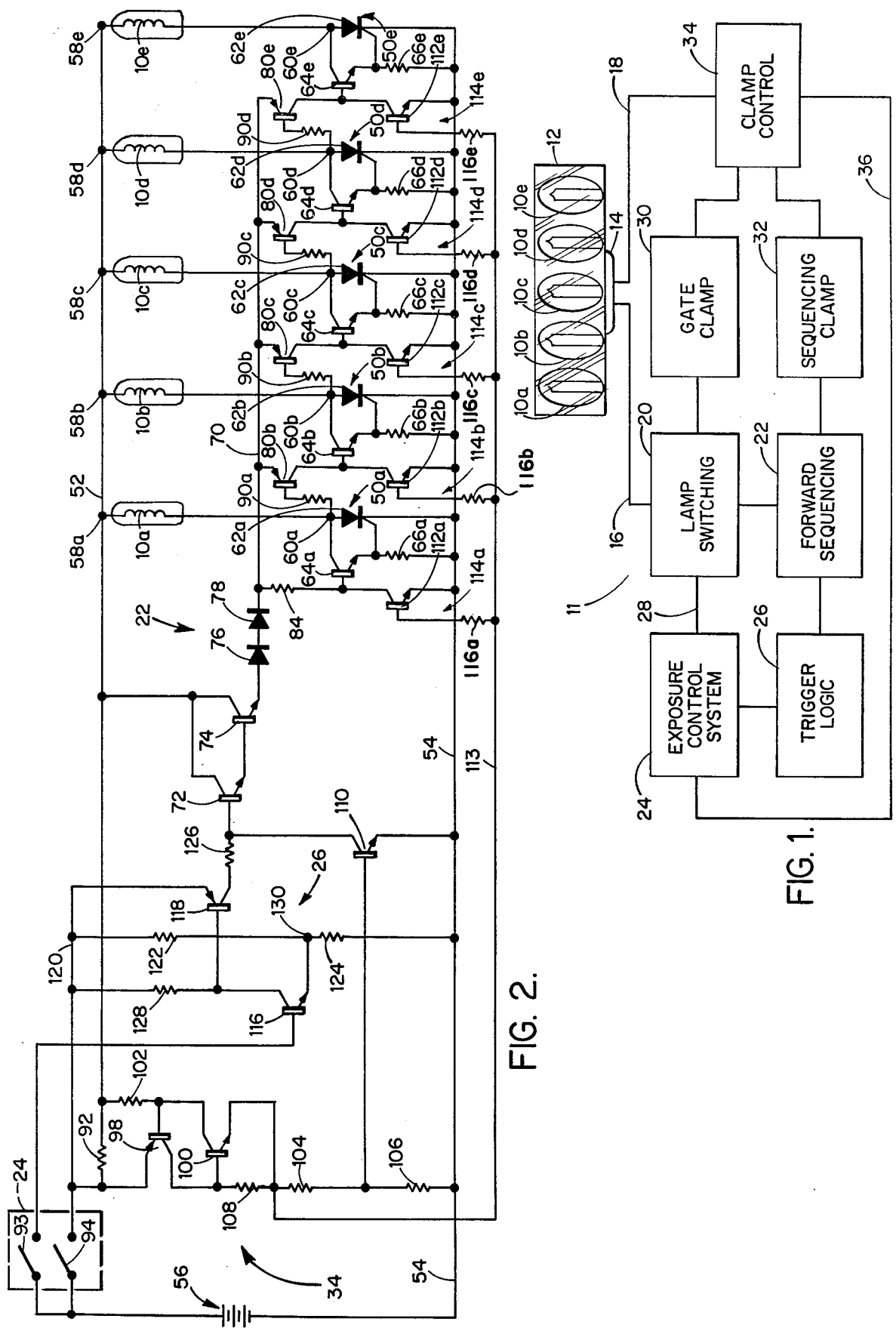
FIG. 1 is a block diagram of an improved photoflash firing circuit employing logic triggering in accordance with the invention.
FIG. 2 is a schematic diagram of the firing circuit illustrated in FIG. 1.

In FIG. 1, the characteristic components performing the sequencing operations in a logic trigger arrangement are illustrated functionally in block form. As shown therein, a linear array of flash lamps or bulbs designated as 10a–10e are mounted in a disposable package designated at 12 for connection to the overall firing circuit, or flash sequencing circuit 11. The terminals of individual flash lamps 10a–10e within the array 12 are grouped at a common connection plug 14 for individual connection to the firing circuit 11 by means of lines designated generally at 16 and 18. In this circuit arrangement, control over ignition currents delivered to each of the flash lamps 10a–10e is provided by a lamp switching function 20 which is, in turn, controlled by a forward sequencing circuit 22. An exposure control system 24 is utilized to both energize the circuit 11 and to control operation of the forward sequencing circuit 22 through a trigger logic circuit 26.

In operation of the overall firing circuit 11, as later explained in regards to FIG. 2, a first signal is received from the exposure control system 24 to generally energize the circuit, that is, couple the circuit 11 to an appropriate power source, shown in FIG. 2. This functional coupling between the exposure control system 24 and the circuit 11 is indicated at lines 28 and 36. Following energization, the exposure control system 24 then actuates the trigger logic circuit 26 so as to fire the next unflashed lamp in the array 12 in accordance with operation of the forward sequencing circuit 22. The latter circuit 22 serves to enable the lamps 10a–10e within array 12 in succession in a predetermined firing order of first to last.

The lamp switching function 20 comprises a plurality of individual switching circuits (later explained in detail with regard to FIG. 2) which operate to couple individual lamps across a voltage source, such as the camera battery. Each switching circuit is selectively triggered into operation in accordance with the forward sequencing circuit 22. Upon ignition of any particular lamp, the switching function 20 and the forward sequencing circuit 22 are clamped or isolated by means of gate clamp circuits generally designated at 30, and a sequencing clamp, designated at 32, so as to prevent accidental further firing of the flash lamps 10a–10e until a subsequent exposure control signal is received. This clamping function is initiated by a clamp control designated at 34 which is coupled between the lamp array 12 as functionally shown by line 18 and the exposure control system as indicated by line 36. In this arrangement, the clamp control 34 is self-latching so that once rendered operative to isolate the lamp switching function 20 and the forward sequencing 22 responsive to firing of a given lamp, these functions 20 and 22 cannot be again rendered operative until the clamp control is deactivated. The latter is accomplished, as later explained in detail with regards to FIG. 2, by means of the exposure control system 24 which automatically de-energizes the firing circuit 11 and releases the clamp control 34 at the completion of the exposure control operation. Except for the lamp array 12 and the exposure control 24, the circuit is generally constructed in a unitary chip as a monolithic or hybrid integrated circuit which utilizes all of the advantages of size, cost and reliability conventionally associated with solid state, large scale integration.

As shown in FIG. 2, each of the lamps 10a–10e is respectively connected in series with a lamp switching circuit or lamp flashing circuit, designated at 50a–50e. These switching circuits 50a–50e along with their respective lamps 10a–10e are connected in parallel between a positive voltage bus or line 52 and a negative voltage bus or ground line 54 which as later explained in detail may be energized by a voltage source or battery designated at 56. Hence, the voltage lines 52 and 54 in effect provide terminals configured for connection of the series circuits to the voltage source. Each lamp 10a–10e is releasably connected between the voltage line 52 and its respective series circuit 50a–50e by means of a terminal pair generally designated as 58a–58e and 60a–60e. As previously indicated, the flash lamps are preferably arranged in a disposable array, and it should be understood that at least one side of these terminal pairs could be a common terminal.

The overall circuit operation is controlled by an exposure control system 24 which is schematically illustrated in FIG. 2 by means of switching elements 93 and 94. During an exposure operation, a camera shutter system, not shown, is configured to provide a first switching arrangement 94 to complete a circuit between a power supply 56 and line 52, and then, to additionally complete a circuit between this voltage source and the logic circuit 26 by means of a switch-like element 93. Any conventional mechanical or electronic switching arrangement will generally be suitable for these functions. In the shuttering operation, the first switch element 94 is closed, for example, during initial activation of the shutter, to provide energization of the circuit. Then, at a subsequent time during the exposure operation, for example, when the shutter reaches its full open position the switching element 93 is closed or otherwise triggered to activate the logic circuit 26 which, in turn, operating through the forward sequencing circuit 22, fires an appropriate bulb in synchronization with the open shutter arrangement.

For controlling the firing of each individual lamp so that they may be flashed in sequence, each of the switching circuits 50a–50e includes an electronic switch element, designated at 62a–62e. Preferably, these switching elements 62a–62e are silicon controlled rectifiers (hereinafter designated as SCR devices) which may be rendered conductive (assuming the anode is positively biased) in accordance with an appropriate gate bias or signal and thereafter are self-latching so long as the anode voltage of the SCR device remains positive with respect to its cathode. In this arrangement, the SCR devices 62a–62e are each in an anodic connection, through their respective flash lamps 10a–10b, to the positive voltage line 52 and in direct cathodic connection to the negative voltage line 54, as shown. Each of the switching circuits 50a–50e also includes a gate control transistor of the NPN type, designated at 64a–64e. Each of these latter transistors has their emitters and collectors in connection to the gates and anodes respectively of the SCR devices so as to render each conductive in accordance with turning on of its respective gate control transistor. Additionally, dropping resistors, designated at 66a–66e, are also connected between each of SCR gates and the ground line 54, and cooperate with the respective gate control transistors 64a–64e to provide an appropriate voltage on each SCR gate when its respective control transistor is in a conducting state. Hence, it is readily seen that the SCR devices provide means for coupling the lamps across the terminal lines 52 and 54 responsive to a given electrical signal.

Since the overall circuit arrangement of FIG. 2 is designed to fire each of the flash lamps 10a–10e in sequence, or that is, in order of first to last, the base of the first gate control transistor 64a is connected through a simple resistor 84 to a signal line 70 for forward biasing of this transistor 64a in accordance with an appropriate voltage level or signal on line 70. However, the bases of the second and subsequent gate control transistors are coupled through respective PNP logic transistors, 80b–80e so that operation of the second and subsequent gate control transistors is also dependent upon the operational state of the preceding flash lamp as later explained in detail.

Each of the switching circuits 62a–62e is appropriately switched into a conductive state in accordance with a forward sequencing circuit 22 which is configured for providing a signal to the gate control transistors 64a–64e so as to render them conductive, in order, and thus sequentially switch on the SCR devices. The forward sequencing signal for the switch circuits 64a–64e is carried out by a darlington connected transistor pair 72 and 74 which are coupled between power lead 52 and through diodes 76 and 78 to the signal line 70.

The logic transistors 80b–80e have their bases coupled to the anode of the preceding SCR device through series resistors 90b–90e such that their operation is not only a function of the signal level of line 70 but also the anode voltage of the preceding SCR. Hence, the logic transistors 80b–80e are not turned on unless two conditions are satisfied, namely, that a suitable signal level is available on line 70 and that the preceding SCR device is conducting. To clearly describe this arrangement, the operation of the individual lamp switching circuits 50a–50e and the forward sequencing circuit 22 will be described prior to completing the detailed description of the circuit shown in FIG. 2. Assuming that the flash lamps 10a–10e are unfired and appropriate voltage, e.g., 6 volts, is applied between lines 52 and 54 as well as a suitable signal to the base of transistor 72, the gate control transistor 64a of the first switching circuit 50a is rendered conductive so as to switch on the first SCR device 62a, thereby coupling lamp 10a across the positive line 52 and the ground line 54 so as to fire this lamp. At this instant, when the lamp 10a is initially supplied with current and begins to flash, the second SCR device 62b will not turn on because its gate control transistor 64b remains in a non-conductive state. The latter follows from the fact that the logic transistor 80b is not rendered conductive. That is, the voltage across the series circuit between terminals 60a and the emitter of transistor 80b is identical to the voltage across the flashing lamp, and the latter voltage is low inasmuch as the initial lamp resistance is very low. It should be noted, however, that as the lamp filament heats up, its resistance increases (just prior to opening of the filament) and the voltage across the lamp will accordingly increase. However, as later described in detail, the forward sequencing circuit 22 and the lamp switching circuits 50a–50e are isolated or clamped off just subsequent to ignition of a given flash lamp so that they will not fire at this latter time.

Continuing with the sequencing operation, it should be noted that following the firing of the first lamp 10a, when a subsequent trigger signal is received on line 70, the SCR 62a will be in a conductive state and the lamp 10a is open circuited such that the voltage across the transistor 80b will exceed the threshold voltage necessary to forward bias this transistor which, in turn, provides a suitable gating signal to the SCR device 62b through gate control transistor 64b. Upon initiation of current through the lamp 10b, the remaining switch stages 62c–62e will still not be triggered inasmuch as the transistors 80c–80e are in parallel with the conducting lamp 10b and hence, are not sufficiently biased to render them conductive.

As previously indicated, once the firing of a particular bulb is initiated, the circuit is clamped off so as to prevent additional firing due to changes in the operating conditions of the lamp undergoing flashing. This function is provided, in part, by the clamp control network 34 which, as shown in FIG. 2, is coupled to a current sensing resistor 92. The latter is located in series with the positive voltage line 52 such that current flow through this resistor is a function of the lamp flashing. That is, the current passing through the resistor 92 (and the voltage drop across this resistor) is low just prior to and at the very initiation of lamp flashing but increases rapidly as the lamp begins to flash, and in essence, shorts voltage lines 52 and 54.

Making up a portion of the clamp control network 34 are a pair of transistors 98 and 100. As shown, the emitter base junction of the PNP transistor 98 is connected through a resistor 102 so as to be in parallel with the resistor 92 and biased in accordance with the current flow and resulting voltage drop across this latter resistor. Further, the collector-base junction of the NPN transistor 100 is, in turn, coupled across the collector-base junction of transistor 98 so that the former is rendered conductive in accordance with turning on of the latter.

The base of transistor 100 is coupled to its own emitter by means of a resistor 108 such that the clamp control circuit is, in effect, self-latching. Stated otherwise, once the clamp control circuit 34 is energized responsive to suitable current flow through current sensing resistor 92, the clamp control 34 remains in operation until the supply voltage to this circuit portion is disrupted, for example, by opening of switch 94 in the exposure control system 24.

Both the current sensing resistor 92 and resistor 102 are chosen such that current initially drawn through the positive voltage line 52, for example, during the start of forward sequencing, will produce a voltage across the emitter base junction of transistor 98 which is less than its threshold voltage e.g. less than approximately .6 volts but yet will exceed this voltage when actual ignition of one of the lamps takes place. Consequently, upon initial closing of the shutter switch 94, the clamp control circuit 34 remains inoperative due to the low voltage derived across resistor 92. Thereafter, once one of the flash lamps 10a–10e begins to flash and draw sufficient current through the current sensing resistor 92, transistors 98 and 100 will be biased on and thereby cause current flow through a voltage divider network formed by resistors 104 and 106 which couple the emitter of transistor 100 to ground line 54. As explained below, current flow through these resistors 104 and 106 is employed to clamp the forward sequencing circuit 22 and the individual switching circuits 50a–50e so as to temporarily prevent subsequent firing of these circuits.

In this embodiment, both the forward sequencing circuit 22 and the individual lamp switching circuits 50a–50e are individually clamped so as to prevent subsequent firing. Hence, a clamping transistor 110 is coupled between the base of transistor 72 and the ground line 54 such that when transistor 110 is forward biased by an appropriate voltage signal (from clamp control network 34) on its base, the base of transistor 72 is essentially grounded, or that is, the latter transistor is biased to a non-conducting state and no further forward sequencing signals may be applied to signal line 70. Additionally, gate clamping means designated at 114a–114e which are the subject of the commonly assigned, copending application Ser. No. 321,991 of S. Ellin, filed herewith, are coupled to each of the lamp switching circuits 50a–50e so as to isolate these circuits from lamp generated transients. These clamping means 114a–114e include a plurality of clamp transistors designated at 112a–112b each of which is respectively coupled between the base of the gate control transistors 64a–64e and ground line 54 so as to essentially ground the bases of the latter and prevent gating of the SCR devices once the clamp control network 34 becomes operative.

To complete the description of the circuit shown in FIG. 2, the trigger logic circuit 26 will now be described. This logic circuit 26 includes an NPN transistor 116 interconnected with a PNP transistor 118 to essentially provide a buffer stage interposed between the exposure control 24 and the forward sequencing circuit 22. Transistor 116 has its collector coupled to the base of the second transistor 118 and through a resistor 128 to a positive voltage line 120 which is energized with line 52. The emitter of transistor 116 is coupled to a divider network comprising resistors 122 and 124 which is coupled in series between the positive line 120 and the negative line 54 so as to produce a positive voltage of less than the supply voltage 56 at the junction point 130 where the emitter of transistor 116 is coupled. This biases the emitter base junction of the transistor 116 to a given threshold voltage to provide noise isolation of the trigger logic circuit 26, or that is, requires a signal sufficiently above ground so as to avoid triggering due to low level transients which may occur, for example, upon initial energization of the various circuit elements due to activation of switch 94, etc. Preferably, resistors 122 and 124 are made of equal value to provide a bias of one-half the source voltage, e.g., 3 volts at the junction 130 such that the logic signal input to the base of transistor 116 must exceed this voltage to fire the trigger logic circuit.

Continuing on with the description of the logic network 26, transistor 118 is emitter coupled to the positive voltage line 120 and collector coupled through a resistor 126 to the base of the transistor 72 so as to provide an appropriate triggering signal to the forward sequencing circuit responsive to the turning on of transistor 118. The latter is controlled in accordance with the voltage across the resistor 128. Consequently, it can be seen that in accordance with an appropriate logic signal applied by switch 93 to the base of transistor 116 a suitable voltage drop will be produced across resistor 128 in the collector circuit of this transistor so as to bias transistor 118 into conduction and thereby provide a trigger signal to the forward sequencing circuit 22. Hence, it should be understood that the forward sequencing circuit 22 and the logic trigger circuit 26 together provide means for activating each of the switching circuits responsive to a logic signal. Advantageously, in this circuit arrangement, a low level signal suitable for rendering transistor 116 conductive initiates operation of the forward sequencing circuit 22 and the flashing of an appropriate flash lamp 10a–10e assuming that voltage has first been applied between lines 52 and 54 and that the clamping circuit is not yet active.

The overall operation of the circuit shown in FIG. 2 will now be described in its entirety. As previously indicated the circuit is employed in a camera system having an exposure control system 24. The latter includes a first switch or logic device indicated at 94 which initially energizes the circuit by coupling lines 120 and lines 52 to voltage source 56. At a subsequent time during the exposure cycle, for example, when the shutter is at its full open position, a second logic signaling device, for example, switch 93 would then be activated to trigger the flash firing circuit so as to flash one of the bulb units.

Upon initial energization by switch 94, the logic trigger circuit 26 is not in operating condition since it has not yet received a signal from switch 93. Likewise, the forward sequencing circuit 22 while also ready for operation is not yet activated until triggering by the logic circuit 26. Hence, once switch 93 is then closed, transistors 116 and 118 of logic trigger circuit 26 are rendered conductive and they, in turn, render the darlington transistors 72 and 74 conductive so as to force sufficient voltage through diodes 76 and 78 thereby providing a trigger signal on line 70. Assuming none of the bulbs have yet been fired, the signal on line 70 will forward bias the gate control transistor 64a so as to gate the SCR 62a into conduction and draw current through lamp 10a thereby flashing the latter. At this time, as previously explained, the next succeeding circuit 50b will not be triggered into operation inasmuch as transistor 80b is exposed only to the low voltage existing at that time across the firing lamp 10a.

Once lamp 10a begins to flash it not only temporarily cuts off the next switching circuit 50b but it also draws sufficient current through current sensing resistor 92 to activate clamp control network 34 which, in turn, biases the clamp transistors 110 and 112a–112e into operation. This prevents further turns on signals from reaching the forward sequencing circuit 22 and clamps off the gate control transistors 64a–64e of each of the switching circuits 50a–50e so that the latter cannot be fired by internally generated voltages. At this point in the camera cycle, the circuit is effectively shut down and further flashing cannot occur until the clamp control circuit 34 is released. The latter is accomplished by the opening of switch 94 which normally occurs in the exposure cycle at completion of the shutter operation. Upon a second actuation of the shutter device to begin exposure of another frame of film, the cycle is repeated with, however, the operation of the next succeeding lamp in order.

Figure 3:
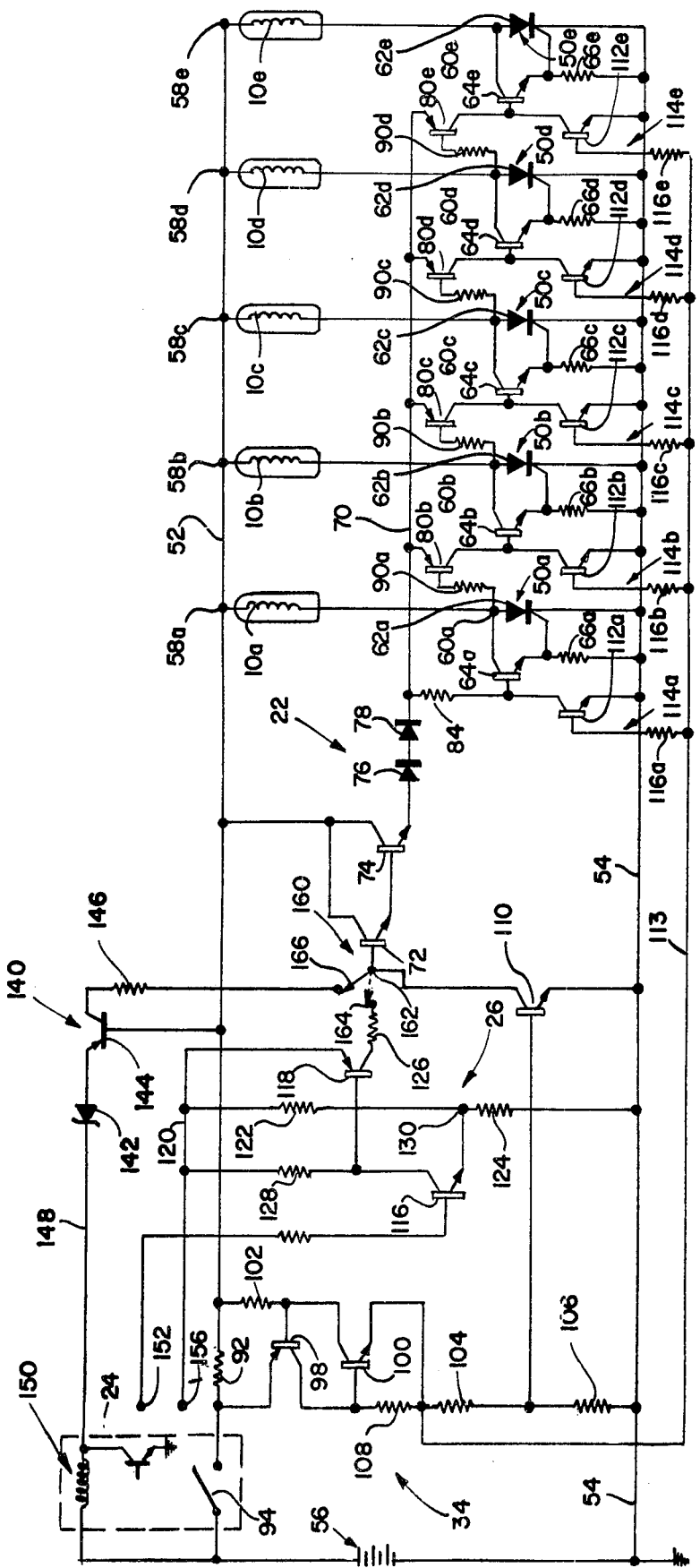
FIG. 3 is a schematic diagram of a photoflash firing circuit illustrating both logic and pulse triggering circuitry.

Preferably, the firing circuit includes both logic and pulse triggering capability so that the circuit may be utilized in cameras providing either type of trigger signal. Since the firing circuit is constructed in integrated or monolithic form, at least the fundamental elements are included within the circuit chip such that with proper interconnection either trigger signal may be utilized. A firing circuit having both logic and pulse triggering networks is illustrated in FIG. 3. As shown therein, a pulse triggering network 140 in operative connection between the forward sequencing network 22 and the exposure system 24 while the logic trigger network 26 is shown with terminal arrangements adapted to convert the firing circuit to that previously described in regard to FIG. 2.

The network 140 includes a Zener diode 142 having its anode in connection to the emitter of a PNP transistor 144. The base of the latter transistor 144 is connected to the positive voltage line 52 while its collector is coupled through a resistor 146 to the transistor 72 of the forward sequencing circuit 22 such that upon application of an appropriate pulse to the cathode line 148 of the Zener diode 142, for example, by means of an inductive element 150 in the exposure system 24, the transistor 72 may be rendered conductive and the firing circuit then operated in a manner similar to that described with regards to FIG. 2. In this arrangement, the Zener diode 142 operates as a voltage detector or voltage sensitive switch which is rendered conductive only upon application of a voltage pulse in excess of the source voltage. As the Zener diode 142 conducts, current is passed through the transistor 144 and its collector resistor 146 so as to turn on the transistor 72. This activates the forward sequencing circuit 22 and ignites the next unfired lamp in the photoflash array.

Trigger circuit 26 is also included in FIG. 3 so as to provide logic triggering capability, if the latter is desired. In this arrangement, trigger circuit 26 is shown having its control transistor 116 in connection to an open terminal 152 which is adapted for reception of an appropriate logic signal from a given camera exposure system (e.g. by means of a switch 93 as shown in FIG. 2). The positive voltage line 120 of the trigger network 26 is also brought out to an open terminal 156 for connection to line 52 when the latter network is to be employed. Finally, coupling of the output of the logic trigger circuit 26 to the forward sequencing circuit 22 (that is, to the transistor 72) must also be made to convert the circuit chip to that shown in FIG. 2. In FIG. 3, the coupling of the outputs of either of the trigger network is symbolically shown by a switch arrangement 160 which is adapted to provide connection between a terminal 162 of the base of transistor 72 and either of the output terminals 164 and 166 of the trigger networks 26 and 140, respectively. It should be understood, of course, that in practice the switch element 160 is a permanent connection formed between the proper terminals in accordance with the desired triggering.

Since it is desirable to provide the firing circuit in an integrated circuit configuration, it is advantageous to at least form the active elements of both trigger circuits when the chip is constructed. For example, the semiconductive junction forming the Zener diode 142 and the junction configurations forming transistor 144 as well as transistors 116 and 118 are included within the basic circuit chip. Additionally, at this time, or at a later time during the semiconductor process, the appropriate resistors of both trigger networks may also be formed. Then, in accordance with the particular trigger configuration desired, an appropriate metalization path may be deposited on the chip so as to interconnect the elements of the desired trigger. Advantageous, the metalization of both trigger networks may be completed as shown so that the camera manufacturer may utilize either by connection of the appropriate input and output terminals of the chosen trigger circuit. Hence, in any case, the circuit chip is constructed to include at least the active elements of both trigger network so that upon appropriate connection, both low level logic triggering or pulse voltage triggering may be utilized for circuit triggering.

Those familiar with the photographic arts will readily appreciate the novel and highly unique advantages of this flash circuit which produces flash lamp sequencing responsive to either a logic or pulse voltage input. The logic trigger provides both noise isolation of a sequencing network and suitable gain to permit low level triggering of the latter. Advantageously, this circuit arrangement provides a flash circuit suitable for use with many different camera exposure systems.

This invention may be practiced or embodied in still other ways without departing from the spirit or essential character thereof. The preferred embodiment described herein is, therefore, illustrative and not restrictive, the scope of the invention being indicated by the appended claims, and all variations which come within the meaning of the claims are intended to be embraced therein.

What is claimed is:

1. An integrated circuit chip for use with a given voltage supply for sequentially flashing a plurality of photolamps responsive to either a low trigger signal having a voltage level equal to or less than the supply voltage or a high trigger signal having a voltage level greater than the supply voltage, said chip comprising:
   a pair of supply terminals configured for electrical coupling to the voltage supply so as to energize said chip;
   a lamp firing circuit coupled to said supply terminals and configured for sequentially firing each of a plurality of photolamps in a predetermined order responsive to repetitive application of a given input signal, said lamp firing circuit including a plurality of lamp switching circuits coupled to said supply terminals in a predetermined order of first to last with each of said switching circuits being configured for electrical coupling to one of the photolamps, and a forward sequencing circuit coupled to each of said lamp switching circuits, said sequencing circuit being configured for actuating the next in order of said switching circuits having an operable photolamp responsive to said given input signal;
   a plurality of trigger circuit elements configured for connection in a first or second trigger circuit configuration to said forward sequencing circuit for respectively providing said input signal responsive to application of the high and low trigger signals, said trigger circuit elements including a voltage detector configured for connection with a first group of said elements in said first trigger circuit configuration to provide said input signal responsive to application of a trigger signal exceeding the supply voltage, and a transistor independent of said first group of elements configured for connection in said second trigger circuit configuration to provide said input signal responsive to application of a trigger signal equal to or less than the supply voltage.

2. The chip of claim 1 including at least one trigger terminal independent of said supply terminals, and wherein said trigger circuit elements are configured for connection between said one trigger terminal and said sequencing circuit.

3. The chip of claim 1 including a first and a second trigger terminal, and wherein said sequencing circuit includes a signal terminal configured for receiving said given input signal, said voltage detector being configured for connection with said first group of said trigger circuit elements in said first trigger circuit configuration between said first trigger terminal and said signal terminal, and said transistor being configured for connection with a second group of said trigger circuit elements in said second trigger circuit configuration between said second trigger terminal and said signal terminal.

* * * * *